United States Patent
Eickhoff et al.

(10) Patent No.: US 9,206,047 B2
(45) Date of Patent: Dec. 8, 2015

(54) METHOD FOR CONCENTRATING AN AQUEOUS HYDROGEN PEROXIDE SOLUTION

(75) Inventors: Hubertus Eickhoff, Alzenau (DE); Florian Lode, Schöneck (DE); Eduardo Arevalo, Bruchköbel (DE); Marc Brendel, Bruchköbel (DE); Claudia Wallert, Haltern (DE)

(73) Assignee: Evonik Degussa GmbH, Essen (DE)

( * ) Notice: Subject to any disclaimer, the term of this patent is extended or adjusted under 35 U.S.C. 154(b) by 158 days.

(21) Appl. No.: 13/817,797

(22) PCT Filed: Jul. 29, 2011

(86) PCT No.: PCT/EP2011/063069
§ 371 (c)(1),
(2), (4) Date: Feb. 19, 2013

(87) PCT Pub. No.: WO2012/025333
PCT Pub. Date: Mar. 1, 2012

(65) Prior Publication Data
US 2013/0146438 A1 Jun. 13, 2013

(30) Foreign Application Priority Data

Aug. 25, 2010 (DE) .......................... 10 2010 039 748

(51) Int. Cl.
*C01B 15/013* (2006.01)
*B01D 1/28* (2006.01)
(Continued)

(52) U.S. Cl.
CPC ............ *C01B 15/013* (2013.01); *B01D 1/2806* (2013.01); *B01D 1/289* (2013.01); *B01D 1/2856* (2013.01); *B01D 3/148* (2013.01); *C01B 15/037* (2013.01); *Y10S 203/19* (2013.01)

(58) Field of Classification Search
CPC ...... B01D 1/289; B01D 1/002; B01D 1/2806; B01D 1/2856; B01D 3/106; B01D 3/12; B01D 3/148; B01D 3/4261; B01D 3/4238; B01D 3/4288; B01D 5/0039; B01D 5/006; C01B 15/013; C01B 15/037; Y10S 159/16; Y10S 159/901; Y10S 203/08; Y10S 203/14; Y10S 203/19
See application file for complete search history.

(56) References Cited

U.S. PATENT DOCUMENTS 2,701,233 A 2/1955 Quinn
2,895,886 A * 7/1959 Schneider ................... 202/158
(Continued)

FOREIGN PATENT DOCUMENTS

CN 85103225 A 1/1987
CN 1257827 A 6/2000
(Continued)

OTHER PUBLICATIONS
English language abstract for CN 85103225 A, published on Jan. 10, 1987.
(Continued)

*Primary Examiner* — Virginia Manoharan
(74) *Attorney, Agent, or Firm* — Law Office of: Michael A. Sanzo, LLC

(57) ABSTRACT

The invention is directed to a process for concentrating aqueous hydrogen peroxide solution to give at least two hydrogen peroxide streams of different concentration in an apparatus which includes a preevaporator (1), a distillation column (2) and a vapour compressor (3). The aqueous hydrogen peroxide solution to be concentrated (4) is continuously fed into the preevaporator; vapour (5) produced by evaporation in the preevaporator is fed to the distillation column; bottom product (6) obtained in the preevaporator is withdrawn as a first concentrated hydrogen peroxide stream (7); vapour (8) produced in the distillation column is withdrawn from the distillation column at the top of the column, compressed by the vapour compressor and used for heating the preevaporator; and the bottom product (9) obtained in the distillation column is withdrawn as a second concentrated hydrogen peroxide stream (10); Concentrated hydrogen peroxide solutions having differing concentrations in the range from 50 to 70% by weight of hydrogen peroxide can be produced at the same time in a freely selectable ratio by feeding part of the bottom product obtained in the preevaporator in liquid form to the distillation column.

20 Claims, 2 Drawing Sheets

(51) Int. Cl.
*B01D 3/14* (2006.01)
*B01D 3/42* (2006.01)
*C01B 15/037* (2006.01)

(56) References Cited

U.S. PATENT DOCUMENTS

| | | | | |
|---|---|---|---|---|
| 3,714,342 | A * | 1/1973 | Kabisch | 423/588 |
| 4,566,947 | A * | 1/1986 | Tsuruta | 203/26 |
| 5,171,407 | A | 12/1992 | Meili | |
| 5,670,028 | A * | 9/1997 | Inaba et al. | 203/86 |
| 6,780,288 | B1 * | 8/2004 | Bloomfield et al. | 203/12 |

FOREIGN PATENT DOCUMENTS

| | | |
|---|---|---|
| DE | 1 084 249 | 6/1960 |
| GB | 907421 | 10/1962 |

OTHER PUBLICATIONS

English language translation of Office Action for corresponding Taiwanese patent application 100129947 and Taiwan IPO Search Report completed Dec. 2, 2013.

Shi, You-Li, "Hydrogen Peroxide Concentration Unit, Its Process Optimization," *Abstracts of Chemical Engineering Design* 16(3) (2006).

English language translation of the International Search Report for PCT/EP2011/063069 filed Jul. 29, 2011.

English language translation of pp. 3-6 of the Written Opinion of the International Searching Authority for PCT/EP2011/063069 filed Jul. 29, 2011.

English language translation of the International Preliminary Report on Patentability for PCT/EP2011/063069 filed Jul. 29, 2011.

English language translation of German patent reference DE 1 084 249, published on Jun. 30, 1960.

"Separation Technology for the Chemical process Industry", pp. 1-24; Sulzer Chemtech; XP55008815, Oct. 18, 2008.

Meili, A., "Practical process intensification shown with the example of a hydrogen peroxide distillation system," 2nd International Conference on Process Intensification in Practice, BHR Group Conference Series 28: 309-318 (1997).

Sulzer Chemtech, "$H_2O_2$ Sulzer Chemtech Distillation and Heat-Pump Technology for the Concentration and Purification of Hydrogen Peroxide," pp. 1-7, Cited Aug. 2010.

Certified English language translation of Notice of Opposition to European counterpart application EP 11748326 with untranslated text attached. The Notice is dated Jun. 29, 2015.

Certified English language translation of Opposition arguments filed for European counterpart application EP 11748326 with untranslated text attached. The arguments are dated Jun. 29, 2015.

* cited by examiner

METHOD FOR CONCENTRATING AN AQUEOUS HYDROGEN PEROXIDE SOLUTION

CROSS REFERENCE TO RELATED APPLICATIONS

The present application is US national stage of international application PCT/EP2011/063069, which had an international filing date of Jul. 29, 2011. Priority is claimed to German application DE 10 2010 039 748.2, filed on Aug. 25, 2010.

Hydrogen peroxide is usually prepared by the anthraquinone process, in which it is obtained in the form of an aqueous solution having a hydrogen peroxide content of from 25 to 40% by weight by extraction of the working solution used in the anthraquinone process. To save transport costs, this crude product of the anthraquinone process is concentrated to a commercial concentration of 50, 60 or 70% by weight by evaporation of water. Specific applications require a purified hydrogen peroxide from which relatively non-volatile impurities have been separated by distillation of the hydrogen peroxide.

In the concentration of hydrogen peroxide, the energy input for the evaporation of water can be reduced by compression of water vapour obtained in the evaporation and heating of the evaporator by means of this compressed vapour, as is known from A. Meili, Proceedings of the 2nd International Conference on Process Intensification in Practice, BHR Group Conference Series 28, 1997, pages 309 to 318, and also the brochure "$H_2O_2$ Sulzer Chemtech Distillation and Heat-Pump Technology for the Concentration and Purification of Hydrogen Peroxide" from Sulzer Chemtech.

The processes known from the prior art have the disadvantage that distillation conditions have to be changed to produce concentrated hydrogen peroxide of differing concentration and upon such a change of distillation conditions an out-of-specification product is obtained for a time, which has to be recirculated to the process. Where a hydrogen peroxide concentrated by evaporation of water and a distilled hydrogen peroxide of differing concentration are obtained in the known processes, the ratio of these two products can be varied only within narrow limits. There is therefore a need for an energy-efficient process for concentrating aqueous hydrogen peroxide solution, which allows to simultaneously produce at least two concentrated hydrogen peroxide solutions of differing concentration in the range from 50 to 70% by weight of hydrogen peroxide in a ratio which can be chosen freely.

It has now been found that this object can be achieved by operating an apparatus for concentrating aqueous hydrogen peroxide solution having a preevaporator, a distillation column and a vapour compressor in such a way that both vapour from the preevaporator and also part of the liquid bottom product obtained in the preevaporator are fed to the distillation column.

The invention therefore provides a process for concentrating aqueous hydrogen peroxide solution to give two hydrogen peroxide streams of different concentration, in which, in an apparatus comprising a preevaporator, a distillation column and a vapour compressor, the aqueous hydrogen peroxide solution to be concentrated is continuously fed into the preevaporator, vapour produced by evaporation in the preevaporator is fed to the distillation column, part of the bottom product obtained in the preevaporator is fed in liquid form to the distillation column and bottom product obtained in the preevaporator is taken off as a first concentrated hydrogen peroxide stream, vapour produced in the distillation column is withdrawn from the distillation column at the top of the column, compressed with the vapour compressor and used for heating the preevaporator and bottom product obtained in the distillation column is withdrawn as a second concentrated hydrogen peroxide stream.

The process of the invention is carried out in an apparatus comprising a preevaporator, a distillation column and a vapour compressor.

All prior art apparatuses, known to those skilled in the art as being suitable for evaporation of an aqueous hydrogen peroxide solution, can be used as preevaporator. Preferably, a single-stage evaporator, particularly preferably a single-stage circulation evaporator, is used as preevaporator. In a further preferred embodiment, the preevaporator is a falling film evaporator.

Figure 2:
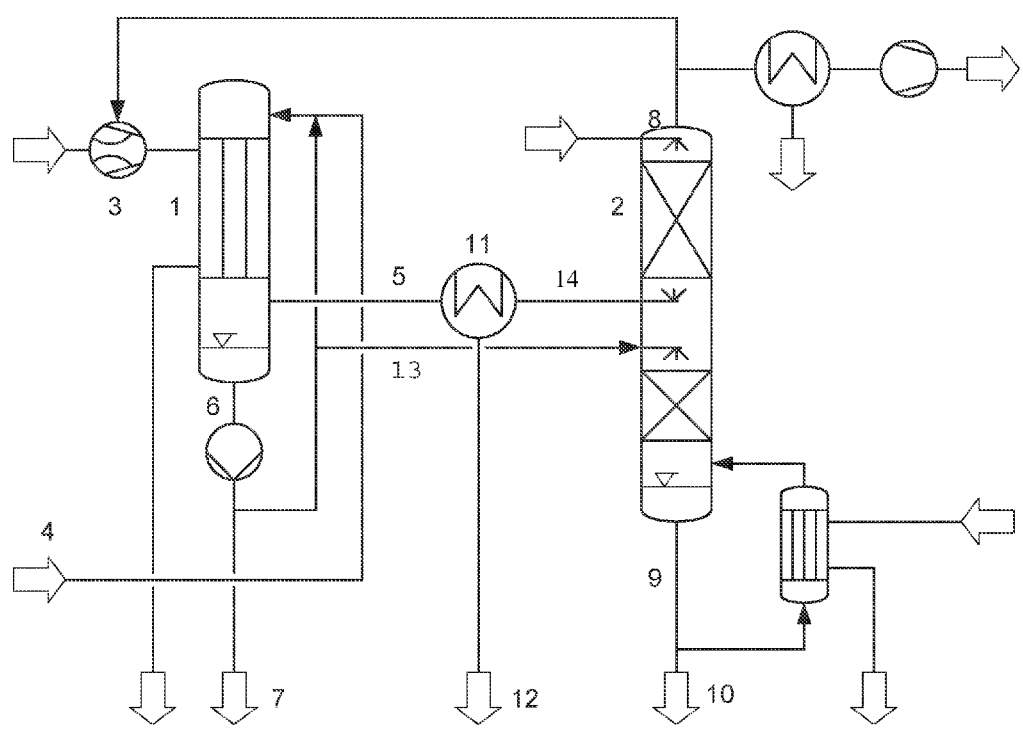
FIG. 2 shows an embodiment of the process of the invention.

All prior art columns, known to those skilled in the art as being suitable for the distillation of an aqueous hydrogen peroxide solution, can be used as distillation column. Preferably, a distillation column is used which has an enrichment section and a stripping section, and also at least one feed inlet between these sections. Preference is given to using a distillation column which contains a random packing or a structured packing to improve the separation performance. The random packing or structured packing can be made of metal, plastic or a ceramic material, with a structured or random packing of metal being particularly preferred. The evaporator of the distillation column can be configured as a separate evaporator, as shown in FIG. 2, or can be configured as part of the distillation column, as known from EP 0 419 406 A1, FIG. 2. The distillation column preferably has a feed line at the top of the column for feeding water to provide the reflux.

All apparatuses known from the prior art for compressing water vapour can be used as vapour compressor. Preferably, a mechanical vapour compressor, particularly preferably a single-stage mechanical vapour compressor, is used as vapour compressor. A mechanical vapour compressor achieves a high energy efficiency and allows a wide operating range. As an alternative, a gas jet pump can be used as vapour compressor, with preference being given to using a gas jet pump using steam as propellant gas. The use of a gas jet pump as vapour compressor has the advantages of lower capital costs and a high availability due to simpler technology.

In the process of the invention, the aqueous hydrogen peroxide solution to be concentrated is fed continuously to the preevaporator. This solution is preferably an aqueous hydrogen peroxide solution which has been obtained in the extraction stage of an anthraquinone process for preparing hydrogen peroxide and contains from 25 to 49% by weight of hydrogen peroxide. The aqueous hydrogen peroxide solution to be concentrated preferably also contains at least one stabilizer for stabilizing the hydrogen peroxide against decomposition. All compounds known for stabilizing hydrogen peroxide can be used as stabilizer. Preferably, alkali metal stannates, alkali metal pyrophosphates, alkali metal polyphosphates and also chelating agents from the group consisting of hydroxycarboxylic acids, aminocarboxylic acids, aminophosphonic acids, phosphonocarboxylic acids and hydroxyphosphonic acids and alkali metal salts thereof are used as stabilizer. Particularly preferred stabilizers are sodium stannate, $Na_4P_2O_7$, $Na_2H_2P_2O_7$, aminotris(methylenephosphonic acid) and sodium salts thereof and also 1-hydroxyethane-2,2-diphosphonic acid and sodium salts thereof.

In the preevaporator, part of the fed aqueous hydrogen peroxide solution to be concentrated is evaporated, with the evaporation preferably being carried out at a pressure of from 70 to 130 mbar and a bottom temperature in the evaporator of from 49 to 69° C. All or part of the vapour produced by evaporation in the preevaporator is fed to the distillation column, with the vapour preferably being passed through an additional condenser in which part of the vapour is condensed and withdrawn as concentrated hydrogen peroxide stream. Such a partial condensation of the vapour allows to obtain a distilled hydrogen peroxide stream, thus freed of low-volatile impurities, with a little outlay in the process of the invention in addition to two concentrated hydrogen peroxide streams of different concentration. The vapour produced by evaporation in the preevaporator is preferably fed into the distillation column in a middle section, i.e. between the stripping section and the enriching section of the distillation column. The energy consumption of the distillation can be reduced by introduction of the vapour into a middle section of the distillation column.

Part of the bottom product obtained in the preevaporator is fed in liquid form to the distillation column and the remaining part is withdrawn as a first concentrated hydrogen peroxide stream. The bottom product from the preevaporator which is fed in liquid form to the distillation column is preferably fed into the distillation column in a middle section, i.e. between the stripping section and the enrichment section of the distillation column. The energy consumption of the distillation can be reduced by introduction of the liquid bottom product into a middle section of the distillation column.

In the distillation column, water is evaporated by supply of heat and the resulting bottom product of the distillation column is withdrawn as a second concentrated hydrogen peroxide stream. The vapour produced here is withdrawn from the distillation column at the top of the column, and all or part is compressed by means of the vapour compressor and used for heating the preevaporator. Vapour withdrawn from the distillation column and not fed to the vapour compressor is condensed in a condenser of the distillation column. The distillation column is preferably operated at a pressure at the top of the column of from 60 to 120 mbar and at a temperature at the bottom of from 51 to 74° C. The distillation column is preferably operated in such a way that the temperature at the bottom of the distillation column is from 5 to 15° C. higher than the temperature at the bottom of the preevaporator and the concentration of the second concentrated hydrogen peroxide stream is higher than the concentration of the first concentrated hydrogen peroxide stream. Such a choice of the temperatures in the distillation column and in the preevaporator enables the energy consumption for vapour compression to be kept small. In a preferred embodiment, no condensed overhead product of the column is used for producing the column reflux, but instead liquid water is fed at the top of the column. This allows to achieve a particularly low content of hydrogen peroxide in the vapour and to minimize losses of hydrogen peroxide via the vapour.

The pressure required for operating the distillation column is preferably generated with a vacuum pump connected to the top of the column, preferably via the condenser of the distillation column. The pressure required for operating the preevaporator is preferably set by pressure equalization between distillation column and preevaporator along the line that feeds the vapour produced in the preevaporator to the distillation column.

The process of the invention allows to obtain at the same time two concentrated hydrogen peroxide streams of different concentration from an aqueous hydrogen peroxide solution, with the concentration of the two streams preferably being in the range from 40 to 80% by weight and particularly preferably in the range from 49 to 75% by weight. The ratio of the two streams can be adjusted within wide limits by setting the ratio of the proportion used via the vapour compressor for heating the preevaporator to the proportion condensed in the condenser of the distillation column for the vapour obtained in the distillation column and by setting the ratio of the proportion fed in liquid form to the distillation column to the proportion withdrawn as first concentrated hydrogen peroxide stream for the bottom product obtained in the preevaporator.

Figure 1:
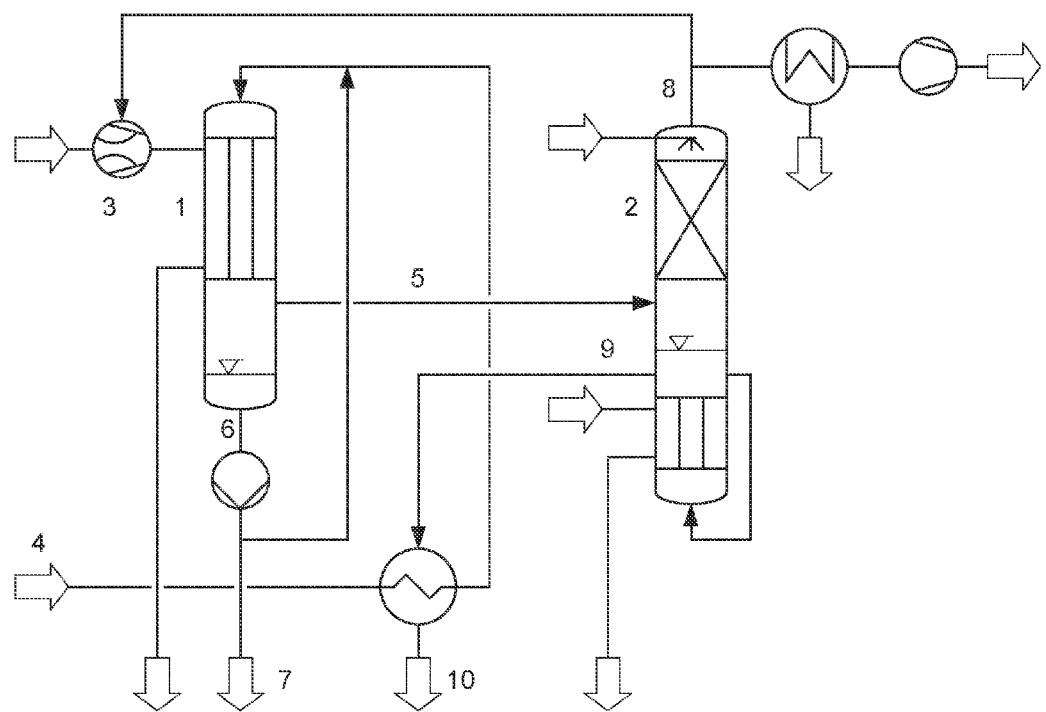
FIG. 1 shows a process known from the brochure "$H_2O_2$ Sulzer Chemtech Distillation and Heat-Pump Technology for the Concentration and Purification of Hydrogen Peroxide" from Sulzer Chemtech, page 6.

FIGS. 1 and 2 illustrate the process of the invention compared to a process known from the prior art.

FIG. 1 shows a process known from the brochure "$H_2O_2$ Sulzer Chemtech Distillation and Heat-Pump Technology for the Concentration and Purification of Hydrogen Peroxide" from Sulzer Chemtech, page 6. Here, the hydrogen peroxide solution (4) to be concentrated is fed to a preevaporator (1) and vapour (5) produced by evaporation in the preevaporator is fed to the distillation column (2). The bottom product (6) obtained in the preevaporator (1) is withdrawn as first concentrated hydrogen peroxide stream (7), in the brochure of Sulzer referred to as TG (purge). The vapour (8) produced in the distillation column (2) is withdrawn from the distillation column (2) at the top of the column, compressed via the vapour compressor (3) and used for heating the preevaporator (1). Bottom product (9) obtained in the distillation column (2) is withdrawn as a second concentrated hydrogen peroxide stream (10), referred to in the brochure of Sulzer as CG (product). In this process, all the hydrogen peroxide which is withdrawn as hydrogen peroxide stream (10) has to be evaporated in the preevaporator (1) and the ratio of the hydrogen peroxide streams (7) and (10) can be adjusted only within narrow limits at a given concentration of the two hydrogen peroxide streams.

FIG. 2 shows an embodiment of the process of the invention. In contrast to the known process of FIG. 1, part of the bottom product (6) obtained in the preevaporator (1) is fed in liquid form (13) to the distillation column (2) in this process. Even at given concentrations for the hydrogen peroxide streams (7) and (10) the ratio of these streams can be adjusted in the process of the invention within wide limits by adjusting the proportion of the bottom product (6) which is fed to the distillation column and the proportion which is withdrawn as concentrated hydrogen peroxide stream (7). Since the part of the hydrogen peroxide used, which is fed in liquid form to the distillation column, is not evaporated in the process, less energy is required than in the process of FIG. 1. In the embodiment shown in FIG. 2, part of the vapour (5) produced by evaporation in the preevaporator (1) is condensed in an additional condenser (11) and taken off as a third concentrated hydrogen peroxide stream (12). After leaving the condenser (11), the remaining part of the vapour (14) is fed to the distillation column (2). In this embodiment, the process of the invention additionally allows one to obtain a hydrogen peroxide which has largely been freed of low-volatile compounds by distillation, where the amount and concentration of this purified hydrogen peroxide can be selected within wide limits by choice of the operating conditions for the preevaporator (1) and the additional condenser (11).

The following example illustrates the embodiment of the process of the invention shown in FIG. 2. The preevaporator (1) is operated with a pressure of 120 mbar and a temperature at the bottom of 61° C. The distillation column (2) is operated with a pressure at the top of the column of 104 mbar and a temperature at the bottom of 70° C. 10 000 kg/h of hydrogen peroxide solution (4) to be concentrated having a concentration of 40.0% by weight are fed to the preevaporator. 2502 kg/h of vapour (5) having a hydrogen peroxide content of 8.5% by weight are produced in the preevaporator. A third concentrated hydrogen peroxide stream (12) having a concentration of 45.1% by weight is obtained from the vapour in an amount of 152 kg/h by partial condensation in the additional condenser (11) and the uncondensed vapour (14) is fed in gaseous form to the distillation column (2). 1830 kg/h of the bottom product (6) from the preevaporator are withdrawn as a first concentrated hydrogen peroxide stream (7) having a concentration of 50.5% by weight and bottom product (6) obtained is also fed in liquid form (13) to the distillation column (2). 769 kg/h of water are fed into the distillation column (2) at the top of the column to produce the reflux. In the distillation column, the hydrogen peroxide is concentrated further by supplying 1487 kW of heat to the evaporator of the distillation column and a second concentrated hydrogen peroxide stream (10) having a concentration of 70.5% by weight (which is higher than the concentration in the first (7) or third (12) concentrated hydrogen peroxide streams) is withdrawn in an amount of 4173 kg/h from the bottom of the column. 1094 kg/h of the vapour produced in the distillation column are compressed with the vapour compressor (3) to a pressure of 320 mbar and the preevaporator (1) is heated with the compressed vapour. The remaining vapour produced in the distillation column is condensed. The energy consumption for compressing the vapour with steam in the vapour compressor (3) configured as a gas jet pump is 976 kW.

List of reference numerals in the figures:
(1) preevaporator
(2) distillation column
(3) vapour compressor
(4) hydrogen peroxide solution to be concentrated
(5) vapour being carried by conduit from the preevaporator
(6) bottom product from the preevaporator
(7) first concentrated hydrogen peroxide solution
(8) vapour from the distillation column
(9) bottom product from the distillation column
(10) second concentrated hydrogen peroxide solution
(11) additional condenser
(12) third concentrated hydrogen peroxide solution
(13) part of the bottom product from the preevaporator being fed by conduit to the distillation column
(14) part of vapour from the preevaporator being fed by conduit to the distillation column (2) after leaving the additional condenser (11)

The invention claimed is:

1. A process for concentrating an aqueous hydrogen peroxide solution in an apparatus comprising a preevaporator, a distillation column and a vapour compressor to give at least two hydrogen peroxide streams of different concentration, said process comprising feeding an aqueous hydrogen peroxide solution to be concentrated continuously to the preevaporator, feeding vapour produced by evaporation in the preevaporator to the distillation column via a conduit, withdrawing bottom product from the preevaporator as a first concentrated hydrogen peroxide stream, withdrawing vapour from the distillation column at the top of the column and compressing it with the vapour compressor for heating the preevaporator, and withdrawing bottom product from the distillation column as a second concentrated hydrogen peroxide stream, wherein part of the bottom product from the preevaporator is fed in liquid form to the distillation column via a conduit.

2. The process of claim 1, wherein said part of the bottom product from the preevaporator which is fed to the distillation column is fed to a middle section of the distillation column.

3. The process of claim 1, wherein said vapour produced by evaporation in the preevaporator and fed to the distillation column is fed to a middle section of the distillation column.

4. The process of claim 1, wherein part of the vapour produced by evaporation in the preevaporator and fed to the distillation column is condensed in an additional condenser prior to delivery to the distillation column and withdrawn as a third concentrated hydrogen peroxide stream.

5. The process of claim 1, wherein the distillation column is operated with a bottom temperature 5 to 15° C. higher than the temperature at the bottom of the preevaporator.

6. The process of claim 1, wherein the concentration of the second concentrated hydrogen peroxide stream is higher than the concentration of the first concentrated hydrogen peroxide stream.

7. The process of claim 1, wherein said vapour compressor is a mechanical vapour compressor.

8. The process of claim 1, wherein said vapour compressor is a gas jet pump using steam as propellant gas.

9. The process of claim 1, wherein said distillation column comprises a metal packing selected from the group consisting of structured packings and random packings.

10. The process of claim 1, wherein the concentration of the product from the distillation column withdrawn as a second concentrated hydrogen peroxide stream is higher than the concentration of the first concentrated hydrogen peroxide stream withdrawn as bottom product from the preevaporator and higher than a third concentrated hydrogen peroxide stream produced by condensing vapour from the evaporator prior to delivery to the distillation column.

11. The process of claim 10, wherein said part of the bottom product from the preevaporator which is fed to the distillation column is fed to a middle section of the distillation column.

12. A process for concentrating an aqueous hydrogen peroxide solution in an apparatus comprising a preevaporator, a distillation column separate from said preevaporator and a vapour compressor to give at least three hydrogen peroxide streams of different concentration, said process comprising feeding an aqueous hydrogen peroxide solution to be concentrated continuously to the preevaporator, feeding vapour produced by evaporation in the preevaporator to the distillation column, withdrawing bottom product from the preevaporator as a first concentrated hydrogen peroxide stream, withdrawing vapour from the distillation column at the top of the column and compressing it with the vapour compressor for heating the preevaporator, and withdrawing bottom product from the distillation column as a second concentrated hydrogen peroxide stream, wherein part of the bottom product from the preevaporator is fed in liquid form to the distillation column.

13. The process of claim 12, wherein said part of the bottom product from the preevaporator which is fed to the distillation column is fed to a middle section of the distillation column.

14. The process of claim 13, wherein said vapour produced by evaporation in the preevaporator and fed to the distillation column is fed to a middle section of the distillation column.

15. The process of claim 12, wherein part of the vapour produced by evaporation in the preevaporator and fed to the distillation column is condensed in an additional condenser prior to delivery to the distillation column and withdrawn as a third concentrated hydrogen peroxide stream.

16. The process of claim 15, wherein the concentration of the second concentrated hydrogen peroxide stream is higher than the concentration of the first concentrated hydrogen peroxide stream.

17. The process of claim 16, wherein the concentration of the second concentrated hydrogen peroxide stream is higher than the concentration of the third concentrated hydrogen peroxide stream.

18. The process of claim 17, wherein said part of the bottom product from the preevaporator which is fed to the distillation column is fed to a middle section of the distillation column.

19. The process of claim 18, wherein said vapour produced by evaporation in the preevaporator and fed to the distillation column is fed to a middle section of the distillation column.

20. The process of claim 19, wherein the distillation column is operated with a bottom temperature 5 to 15° C. higher than the temperature at the bottom of the preevaporator.

* * * * *